United States Patent Office 2,992,861
Patented July 18, 1961

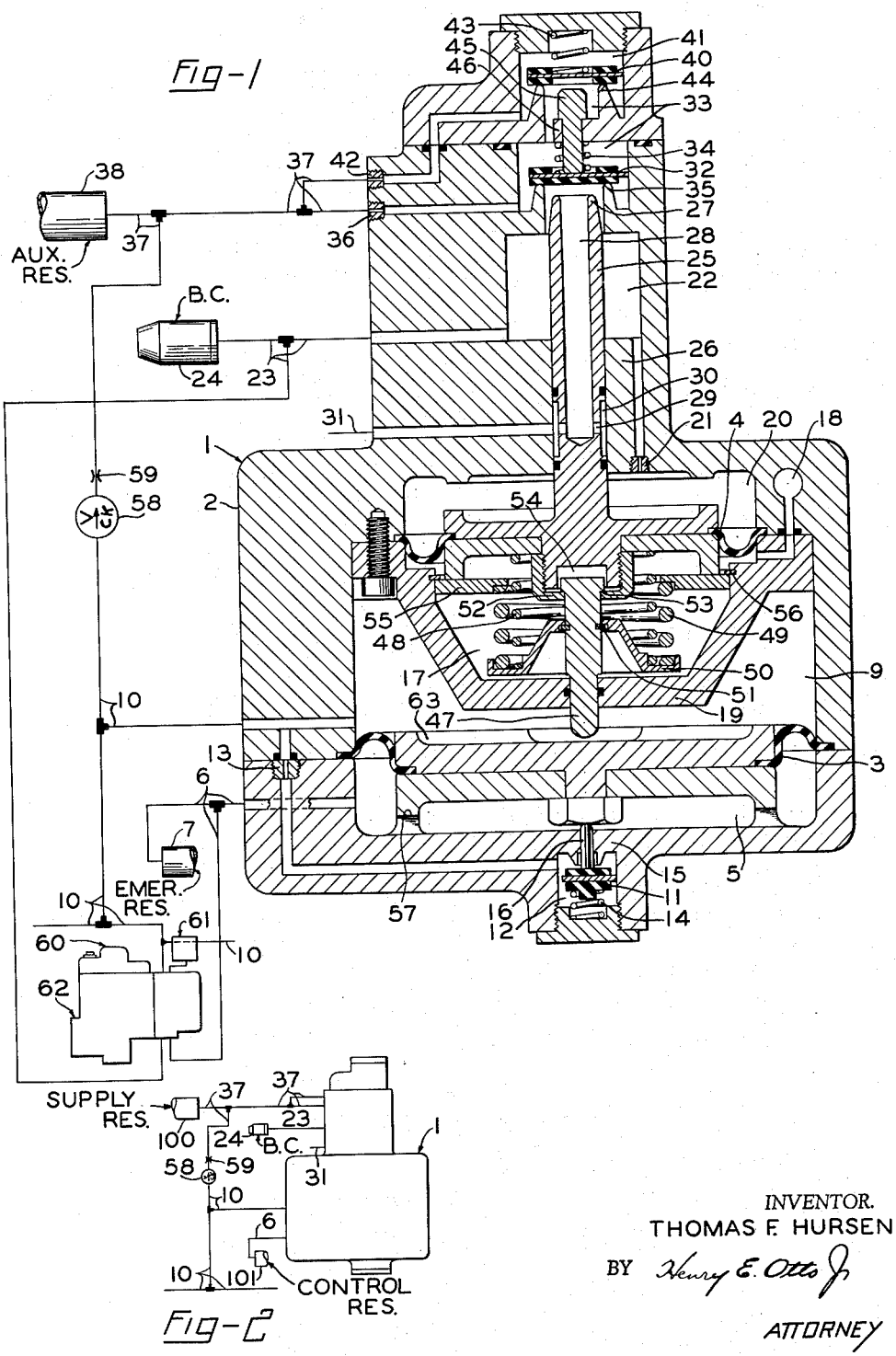

2,992,861
BRAKE CONTROLLING VALVE DEVICE
Thomas F. Hursen, Monroeville, Pa., assignor to Westinghouse Air Brake Company, Wilmerding, Pa., a corporation of Pennsylvania
Filed Apr. 27, 1959, Ser. No. 809,073
11 Claims. (Cl. 303—33)

This invention relates to fluid pressure brake apparatus for railway cars and more particularly relates to brake controlling valve devices for use with such apparatus and embodying a novel combined service and inshot valve device.

In brake controlling valve devices of types heretofore proposed, an inshot valve device separate and distinct from a service valve device has been employed. The service valve device responds to reductions and restorations in pressure of fluid in a brake pipe to supply pressure fluid to and release pressure fluid from a flow communication containing a choke and leading to a brake cylinder. The inshot valve device is subject opposingly to brake cylinder pressure and a spring bias and operative, whenever brake cylinder pressure is less than a chosen value, such as 10 p.s.i., to permit flow of pressure fluid from the service valve device to the brake cylinder at a rapid rate in by-pass of said choke for effecting rapid take-up of slack in the brake rigging.

The principal object of the invention is to provide a novel combined service and inshot valve device to take the place of the separate service and inshot valve devices heretofore employed in brake apparatus of the above general type.

According to this object, there is provided a combined service and inshot valve device comprising two coaxially arranged movable abutments, such as diaphragm pistons, having a lost-motion type operative connection so as to be operable as a stack, which stack is subject to brake pipe pressure and brake cylinder pressure opposing pressure of fluid in a reservoir, such as an emergency reservoir or a control reservoir, normally containing fluid at the normal charge value of brake pipe pressure. An inshot spring normally biases the pistons relatively apart to one limit of such lost motion connection, in which said spring is caged, so that upon a reduction in brake pipe pressure below pressure of fluid in such reservoir said pistons will move in unison for successively closing a normally open brake cylinder release communication and then opening a normally closed brake cylinder supply communication, and thereafter opening an inshot communication, whereby pressure fluid will initially be supplied from a source to a brake cylinder at a fast rate corresponding to the combined flow capacities of the supply and inshot communications. When, however, brake cylinder pressure exceeds a preselected value, one of said pistons will move toward the other end against resistance of the inshot spring to the other limit of such lost motion and thereby recage said inshot spring and permit closure of the inshot communication while maintaining the supply communication open, for supplying pressure fluid to the brake cylinder via and at the restricted rate controlled by the supply communication until brake cylinder pressure attains a value corresponding substantially to the extent brake pipe pressure has been reduced below pressure in such reservoir; whereupon the pistons will move in unison to a lap position in which all of the above-mentioned communications are concurrently closed for bottling up pressure fluid in the brake cylinder. The inshot spring will not be uncaged and bias the pistons relatively apart to said one limit of lost motion until brake cylinder pressure is reduced to below said preselected value.

Charging of the emergency reservoir or control reservoir, as the case may be, to equality with brake pipe pressure may, if desired, be controlled by a charging valve mechanically operably opened by said other piston when brake pipe pressure equals or exceeds the pressure of fluid in such reservoir; and in such event, means are preferably provided for limiting the expansion of a release spring (that biases the stack to a release-valve-opening or release position) so as to prevent said spring from biasing said other piston to a charging-valve-opening position.

If an emergency reservoir is used, means are provided for connecting such reservoir to the brake cylinder only during an emergency application of brakes; and the aforementioned source of pressure fluid is an auxiliary reservoir of such volume as to provide a brake cylinder pressure corresponding to that desired upon a full service application of brakes when only auxiliary reservoir pressure equalizes into the brake cylinder. If, however, a control reservoir is used, in which pressure fluid is bottled up during both service and emergency applications of brakes, then such source of pressure fluid is a supply reservoir of such volume as to provide a higher brake cylinder pressure corresponding to that desired upon an emergency venting of the brake pipe.

Other objects and advantages will become apparent from the following more detailed description of the invention and from the accompanying drawing, wherein:

FIG. 1 is a diagrammatic view, partly in section and partly in outline, of an improved fluid pressure brake apparatus embodying a novel combined service and inshot valve device controlled according to variations in brake pipe pressure relative to pressure of fluid in an emergency reservoir; and FIG. 2 is a diagrammatic view of a fluid pressure brake apparatus illustrating another embodiment of the invention whereby a combined service and inshot valve device, shown in outline but identical structurally with that shown in section in FIG. 1, is controlled by variations in brake pipe pressure relative to pressure of fluid in a control reservoir.

*Description—FIG. 1*

The fluid pressure brake apparatus according to this embodiment of the invention comprises a combined service and inshot valve device 1 comprising a sectionalized casing 2 in which are reciprocably mounted two coaxially arranged, axially spaced movable abutments, preferably in the form of diaphragm pistons 3, 4 of different effective areas, and cooperatively connected through the medium of a lost-motion connection, in the manner presently to be described, so as to constitute a movable abutment stack. The larger piston 3 has at one side a chamber 5 open via a pipe 6 to an emergency reservoir 7, and has at the opposite side a chamber 9 open to a branch of a brake pipe 10 adapted to extend from the locomotive through each car of the train.

Charging of the reservoir 7 is preferably controlled by a poppet-type charging valve 11 arranged coaxially with piston 3 and contained in a chamber 12 open via a charging choke 13 to a branch of brake pipe 10. When fluid pressures in chambers 5, 9 are equal, the weight of piston 3 transmitted via a fluted pusher stem 16 to valve 11 will be sufficient to unseat said valve against resistance of a helical bias spring 14 in chamber 12 so that pressure in reservoir 7 may equalize with that in the brake pipe 10; said stem having slidably guided contact within an aligned opening through a casing partition 15 separating chamber 12 from chamber 5. However, if preferred, some other form of charging valve arrangement may be employed for charging the reservoir 7 from the brake pipe 10.

The smaller piston 4 has at one side a chamber 17 open to atmosphere via a vent port 18 and separated by a casing partition 19 from chamber 9. Piston 4 has at the opposite side a chamber 20 open via a baffle choke 21, a chamber 22, and a brake cylinder pipe 23 to a brake cylinder 24. Coaxially connected to the chamber 20 side of piston 4 is a cylindrical follower stem 25 which has slidably guided contact with the wall of an aligned bore through a casing partition 26 separating chambers 20, 22 and extends through chamber 22. Stem 25 terminates in an integrally formed coaxially arranged annular brake cylinder release valve 27 encircling a bore-like opening 28 that extends axially toward piston 4 and is constantly connected via radial ports 29 and an elongated annular cavity 30 to a brake cylinder release pipe 31 that, in turn, is either directly connected to atmosphere or indirectly connected to atmosphere by way of a conventional brake cylinder retaining valve device (not shown); and O-ring seals carried by stem 25 and disposed above and below the cavity 29 respectively prevent leakage of pressure fluid from chambers 22, 20 to the pipe 31.

A preferably poppet-type brake cylinder supply valve 32 is contained in a chamber 33 and normally biased by a helical spring 34 in said chamber into contact with an annular valve seat rib 35 formed in a casing partition separating chambers 33, 22, so as to prevent fluid flow from chamber 33 to chamber 22; however, release valve 27, which projects with radial clearance into the central opening in seat rib 35, is adapted to sealingly abut and then unseat supply valve 32 for permitting such flow. Chamber 33 is constantly open via a brake cylinder application choke 36 and a pipe 37 to an auxiliary reservoir 38.

Arranged coaxially with supply valve 32 is a preferably poppet-type inshot valve 40 contained in a chamber 41 connected to a branch of pipe 37 via an inshot choke 42 of substantially greater flow capacity than choke 36 or, if preferred, connected to pipe 37 directly without a choke such as 42. Inshot valve 40 controls connection of chamber 41 with chamber 33 and is biased by a helical spring 43 in chamber 41 into seating contact with an annular valve seat rib 44 encircling one end of chamber 33, so as normally to disestablish such connection. When supply valve 32 is pushed upwardly in excess of a certain distance by release valve 27, said supply valve acting through a coaxially arranged pusher stem 45 is adapted to operatively unseat the inshot valve 40 for permitting pressure fluid to flow from pipe 37 via inshot choke 42 (if used) and the unseated inshot valve to chamber 33 at a rapid rate in by-pass of the more restricted application choke 36; said pusher stem having slidably guided contact with the wall of an aligned bore through a casing ledge 46 projecting laterally into chamber 33.

Arranged coaxially with pistons 3, 4 is a pusher stem 47 that intermediate its ends has sealing slidably guided contact with the wall of an aligned bore through the casing partition 19. Encircling pusher stem 47 and contained in chamber 17 are two concentrically arranged helical springs 48, 49, both of which at their lower ends seat against an annular spring seat washer 50 that is biased by said springs into contact with a retaining ring 51 which is snapped onto said pusher stem so as to limit the extent of expansion of said springs in the direction of piston 3.

The inner spring 48 at its upper end bears against the chamber 17 side of piston 4 and acts to push piston 4 and thereby an annular nut constituting part of said piston upward so that an inwardly directed pusher-stem-encircling flange 52 on said nut will engage an outwardly directed radial shoulder 53 formed on an enlarged head portion of the pusher stem, whereby spring 48 will normally be caged because the lower end of said spring acts downward on said pusher stem via washer 50 and ring 51. This head portion of stem 47 extends into a recess 54 formed in the chamber 17 side of piston 4 and of such depth as to permit upward movement of stem shoulder 53 relative to flange 52 for thereby permitting uncaging of spring 48.

Spring 49 at its upper end bears against an annular spring seat washer 55 which is pressed by said spring into contact with a retaining ring 56 carried by the side wall of chamber 17, so as to limit the extent of expansion of spring 49 in the direction of piston 4. Thus spring 49 is normally backed up by washer 55 and ring 56 and acts through washer 50, ring 51 and engagement of shoulder 53 with flange 52 to pull piston 4 down into contact with the upper side of washer 55, thereby defining a brake release position of the movable abutment stack. In this position of the stack, spring 49 is caged; release valve 27 is retracted from contact with supply valve 32 for connecting brake cylinder 24 with release pipe 31; and supply valve 32 and inshot valve 40 are concurrently seated by their respective springs 34, 43.

Spring 49 is a release spring which, as will become understood presently, biases the movable abutment stack to its release position when brake pipe pressure in chamber 9 is within a chosen degree, such as 3 p.s.i., of emergency reservoir pressure as noted in chamber 5. Spring 49 is caged in the release position of the stack, as just described, to prevent said spring from operatively, through stem 47, biasing the piston 3 downward far enough to operatively unseat charging valve 11 when brake pipe pressure is within the illustrative 3 p.s.i. of emergency reservoir pressure. Spring 48 is an inshot spring having a bias effect, when uncaged, equivalent to that preselected value, such as 10 p.s.i., of brake cylinder pressure at which slack will have been taken up in the brake rigging.

Operation—FIG. 1

In operation, assume initially that the brake apparatus is devoid of fluid under pressure. Under this condition, the various components of valve device 1 will be in the respective positions in which they are shown in FIG. 1, the charging valve 11 being unseated against the bias force of spring 14 by virtue of the weight of piston 3 which is movable downward independently of stem 47 into contact with a stop rim 57 in the end wall of chamber 5.

To initially charge the apparatus, brake pipe 10 is charged with pressure fluid at the locomotive in the well-known manner. On a particular car, some of this pressure fluid will flow via a branch of brake pipe 10 and at a substantially unrestricted rate to chamber 9 of device 1 for holding piston 3 in contact with rim 57 and maintaining charging valve 11 unseated. Some pressure fluid will also flow from brake pipe 10 via and at the restricted rate controlled by charging choke 13 to chamber 12 and thence past the unseated valve 11 and along fluted stem 16 to chamber 5 and also via pipe 6 to the emergency reservoir 7, for charging said reservoir to equality with brake pipe pressure. Meanwhile, some pressure fluid will also flow from a branch of brake pipe 10 via a check valve 58 and a charging choke 59 to a branch of pipe 37 for charging the auxiliary reservoir 38 to substantial equality with brake pipe pressure. Some pressure fluid will flow via one branch of pipe 37 and the large capacity inshot choke 42 (if used) to chamber 41 and via another branch of said pipe and the more restricted choke 36 to chamber 33. Hence, inshot valve 40 and supply valve 32 will be maintained seated by their respective springs 43, 34 during initial charging of the apparatus. Spring 49 will operatively bias piston 4 into contact with washer 55, as shown, for thereby maintaining release valve 27 disengaged from supply valve 32 and thereby maintaining the brake cylinder 24 vented via chamber 22, opening 28, cavity 30 and brake cylinder release pipe 31.

Hence, at completion of initial charging, all components of device 1 will be in the positions in which they are shown in the drawing.

In addition to the structure already described, there is provided an emergency valve device 60, a brake pipe vent valve device 61 and a quick action chamber breather or bleed valve means 62 which, for sake of illustration, may be of the types fully shown and described in U.S. Patent 1,842,481, granted to Thomas on January 26, 1932, with a single minor exception: namely, the ball check valve designated "35" in said patent should be replaced by a plug, inasmuch as charging of the applicant's emergency reservoir 7 is accomplished via charging valve 11. For purposes of subsequent operational description, it need merely be noted that the emergency valve device 60 comprises a piston (not shown) subject to brake pipe pressure and a heavy spring bias opposing pressure of fluid in a quick action chamber (not shown) which is charged with pressure fluid at a restricted rate from the brake pipe; that upon a service rate of reduction in brake pipe pressure, the breather valve means 62 will effect a corresponding rate of reduction in quick action chamber pressure for thereby preventing movement of the emergency valve piston against the spring bias to an emergency position; that upon an emergency rate of reduction in brake pipe pressure and hence in pressure at the brake pipe side of the emergency piston, the latter will be moved by quick action chamber pressure against the spring bias to its emergency position, in which a normally lapped branch of emergency reservoir pipe 6 is connected to a branch of brake cylinder pipe 23 for permitting fluid in the emergency reservoir 7 to equalize into the brake cylinder 24, and in which position quick action chamber pressure is supplied to brake pipe vent valve device 61 for actuating it to locally vent the brake pipe 10 at a rapid rate.

To effect a service application of brakes, brake pipe pressure is reduced a chosen degree at the locomotive in the well-known manner for thereby causing a corresponding degree of reduction in brake pipe pressure in chamber 9 of the valve device 1 on each car. Even though valve 11 is unseated at the completion of initial charging due to the weight of piston 3 as above described, it will be apparent that brake pipe pressure in chamber 9 will reduce at a faster rate than emergency reservoir pressure can reduce by back flow through the restricted charging choke 13; and hence preponderant emergency reservoir pressure in chamber 5 will promptly shift piston 3 upwardly for permitting closure of valve 11. Thereafter, as brake pipe pressure continues to reduce, piston 3 will push pusher stem 47 and hence washer 50 upward against resistance of the release spring 49, which is operatively backed up by ring 56. Meanwhile, as the pusher stem 47 tends to move upward, relative to piston 4, inshot spring 48 will tend to become uncaged and exert an upward bias on said piston and thus initially maintain flange 52 in contact with stem shoulder 53, so that the spring 48 will remain caged; in other words, the spring 48 will resiliently act on piston 4 so that the piston 4, stem 47 and piston 3 will initially move upward in unison.

Meanwhile, as stack 3, 47, 4 is moved upward, release valve 27 will successively sealingly abut and then unseat supply valve 32 against resistance of the pressure of fluid and of light spring 34 in chamber 33; and then as said supply valve is moved in excess of a certain distance away from its seat rib 35, it will through pusher stem 45 operatively unseat inshot valve 40 against resistance of the light bias spring 43 and of fluid pressure in chamber 41. It is to be noted that the only additional upward force required on the movable abutment stack to unseat inshot valve 40 after unseating of supply valve 32 is the light force necesary to overcome spring 43 because as the supply valve is unseated, fluid pressure in chamber 33 will immediately equalize into the brake cylinder 24 and thus "unload" the supply valve while correspondingly "loading" the inshot valve. The upward movement of the pistons 4, 3 in unison will cease when the stack attains an application position, defined by contact of a surface 63 of piston 3 with casing partition 19.

Meanwhile, as soon as supply valve 32 is unseated, pressure fluid will commence to flow from auxiliary reservoir 38 to the brake cylinder 24 at the restricted rate controlled by application choke 36; and upon unseating of the inshot valve 40, pressure fluid will also flow from the auxiliary reservoir to the brake cylinder in by-pass of choke 36 and via the large capacity inshot choke 42 (if used), wih the result that the brake cylinder will be charged with pressure fluid at a rate corresponding to the combined flow capacities of chokes 36, 42 for effecting rapid take-up of slack in the brake rigging.

Until brake cylinder pressure as noted via baffle choke 21 in chamber 20 and acting over the effective area of piston 4 attains the preselected value, illustratively assumed as 10 p.s.i., the inshot spring 48 will maintain the flange 52 in contact with stem shoulder 53. However, when brake cylinder pressure in chamber 20 slightly exceeds the illustrative 10 p.s.i., piston 4 will be shifted downwardly thereby relative to pusher stem 47 and against the resistance of inshot spring 48 which, of course, has now become uncaged. Piston 4 will thus move downward relative to stem 47 until the base of recess 54 engages the head portion of said stem and thus stops further downward relative movement and effectively recages spring 48. A lost-motion connection is thus provided between the piston 4 on the one hand and the pusher stem 47 and piston 3 on the other hand, so that the movable abutment stack comprises two movable abutments 3, 4 cooperatively connected by a lost-motion connection.

As the piston 4 thus moves downward relative to pusher stem 47 and piston 3 to the lower limit of this lost-motion connection, supply valve 32 will be moved correspondingly downward and thus permit spring 43 to seat inshot valve 40 for terminating inshot flow of pressure fluid to the brake cylinder in by-pass of choke 36. The supply valve 32 will, however, still be held unseated following this limited downward relative movement of piston 4; and hence pressure fluid will continue to flow to the brake cylinder 24 solely via and at the restricted rate controlled by application choke 36. When brake cylinder pressure as noted in chamber 20 has increased to a degree corresponding substantially to the extent brake pipe pressure has been reduced below emergency reservoir pressure, the downward force exerted on piston 4 by brake cylinder pressure in chamber 20 (and transmitted via contact of the base of recess 54 with pusher stem 47 and contact of the latter with piston 3), together with the force of release spring 49, will be sufficient to force piston 3 downward out of contact with casing partition 19 against the opposing upward force corresponding to the existing fluid pressure differential across piston 3. The pistons 4, 3 will thereupon move downward in unison causing the stack to assume a lap position, in which release valve 27 maintains sealing contact with supply valve 32 but the latter is seated by spring 34; whereupon fluid under pressure will be bottled up in the brake cylinder 24 at a value corresponding substantially (except for the bias effect of spring 49) to the extent brake pipe pressure has been reduced below emergency reservoir pressure.

To effect a complete release of brakes, the brake pipe 10 is recharged at the locomotive to its normal charge value. On a particular car, the consequent increase in brake pipe pressure in chamber 9 of device 1 will cause the movable abutment stack 3, 47, 4 to be unbalanced and cause the pistons 4, 3 to move downward in unison for unseating release valve 27 and thus releasing pressure fluid from the brake cylinder 24 via opening 28 and release pipe 31. Upon this downward movement of the stack, piston 4 will initially be at the lower limit of its lost motion, in which the base of recess 54 engages the top of pusher stem 47, and said piston will push the washer 55 down away from ring 56 against resistance of release spring 49. When, however, brake cylinder pressure in chamber 20 reduces below the illustrative 10 p.s.i., inshot spring 48 will bias piston 4 upward relative to stem 47 to the upper limit of the lost-motion connection and thus cause spring 48 to become recaged by contact of flange 52 with stem shoulder 53, and cause washer 55 to recontact ring 56, and cause piston 4 to contact said washer but not effect compression of spring 49. When brake pipe pressure builds up to equality with emergency reservoir pressure, the weight of piston 3 will operatively unseat charging valve 11 to permit equalization of emergency reservoir pressure with brake pipe pressure to restore emergency reservoir pressure against any leakage which may have occurred. The pistons 3, 4 will thereupon once again be in the respective positions in which they are shown in FIG. 1.

To effect a partial release of brake cylinder pressure to some desired pressure higher than the illustrative 10 p.s.i., brake pipe pressure is increased to an appropriate value less than normal charge value for causing piston 4 to move downward in the lower limit of its lost motion as just described, until brake cylinder pressure is reduced to said desired pressure, whereupon the stack will reassume its previously-defined lap position for bottling up pressure fluid in the brake cylinder; and under this condition, since the inshot spring 48 has not been uncaged and the base of recess 54 still contacts stem 47, inshot valve 40 will not be unseated if brake pipe pressure is subsequently reduced for applying brakes to a greater degree. On the other hand, if brake pipe pressure is partially restored sufficiently to reduce brake cylinder pressure to some lower pressure below the illustrative 10 p.s.i., the inshot spring 48 will become uncaged and push piston 4 upward until flange 52 contacts pusher stem shoulder 53 and recages said spring, and release valve 27 will sealingly seat against supply valve 32 for bottling up fluid in the brake cylinder at said lower pressure; under this condition, however, the inshot valve 40 will be unseated if brake pipe pressure is subsequently reduced for applying brakes to a greater degree, in the same manner as earlier described.

Assuming now that brake pipe pressure has been reduced at an emergency rate for effecting an emergency application of brakes, the emergency valve device 60 will operate to connect the emergency reservoir pipe 6 to brake cylinder pipe 23 for supplying pressure fluid from emergency reservoir 7 to brake cylinder 24, and brake pipe vent valve device 62 will be actuated to locally vent the brake pipe 10, in the manner above described. Meanwhile, the movable abutment stack of device 1 will be moved upward for successively seating release valve 27, unseating supply valve 32 and then temporarily unseating inshot valve 40, in the manner previously described; however, due to the venting of brake pipe 10 and hence chamber 9, the stack will remain in application position in which the supply valve is open.

It is to be noted that the auxiliary reservoir 38 is of such volume as to provide a brake cylinder pressure corresponding to a full service application of brakes upon equalization of auxiliary reservoir pressure into the brake cyclinder 24 responsively to a full service reduction in brake pipe pressure; whereas, the combined volumes of the auxiliary reservoir 38 and emergency reservoir 7 are such as to produce a higher brake cylinder pressure of a magnitude corresponding to equalization of pressures in both of these reservoirs 38, 7 into the brake cylinder 24 when said reservoirs are concurrently connected to the brake cylinder in response to an emergency reduction in brake pipe pressure. It will also be noted that even though the pressure in the emergency reservoir 7 is reduced somewhat (for example from 70 p.s.i., if that is the normal charge value of brake pipe pressure, to say 60 p.s.i. when pressure in said reservoir equalizes into the brake cylinder during emergency), the fluid pressure differential across piston 3 will nevertheless be sufficient to maintain the stack in application position as above described.

*Description and operation—FIG. 2*

The brake apparatus constructed according to this embodiment of the invention is identical with that shown and described in connection with FIG. 1 except that pipe 37 leads to a supply reservoir 100 (instead of to auxiliary reservoir 38), and pipe 6 leads to a control reservoir 101 (instead of an emergency reservoir 7), and hence the same reference numerals will be used to identify components in FIG. 2 which are identical with those in FIG. 1.

The supply reservoir 100, unlike auxiliary reservoir 38, is of such volume as to provide a desired brake cylinder pressure (such as the illustrative 60 p.s.i.) when, in response to venting of the brake pipe 10 during an emergency, the supply valve 32 of valve device 1 is held open and permits equalization of supply reservoir pressure into the brake cylinder 24. The control reservoir 101, unlike emergency reservoir 7, remains charged with pressure fluid at the normal charge value of brake pipe pressure during both service and emergency applications of brakes, there being no means provided for reducing control reservoir pressure during an emergency application of brakes.

It will thus be apparent that the reservoirs 100, 101 will be charged in the same manner as the reservoirs 38, 7, respectively, of FIG. 1; and that the valve device 1 will function in the same manner as already described in connection with FIG. 1 except that pressure fluid will be supplied from the supply reservoir 100 (instead of auxiliary reservoir 38) to the brake cylinder 24, and no reduction in pressure in control reservoir 101 and hence in chamber 5 will occur during an emergency venting of the brake pipe 10.

Having now described the invention, what I claim as new and desire to secure by Letters Patent, is:

1. In a fluid pressure brake apparatus of the type comprising a normally charged brake pipe, a source of fluid under pressure, and a brake cylinder: a combined service and inshot valve device comprising two coaxially arranged movable abutments cooperatively connected via a lost-motion connection so as to be operable as a stack, said stack being subject to pressure of fluid in a chamber normally containing fluid at the normal charge value of brake pipe pressure acting in opposition to brake pipe pressure and brake cylinder pressure, means providing a release communication via which the brake cylinder may be vented, a supply communication including a restriction via which pressure fluid may flow from the source to the brake cylinder, and an inshot communication via which pressure fluid may flow from the source to the brake cylinder at a rapid rate in by-pass of the restriction, valve means controlled by said stack and interposed in and controlling opening and closing of the aforesaid communications, and an inshot spring biasing said movable abutments apart to one limit of the lost-motion connection, said valve means normally being biased to one position for opening said release communication and closing said supply communication and inshot communication, said movable abutments while biased apart being movable in unison responsively to a reduction in brake pipe pressure below the pressure in said chamber to actuate said valve means to another position for closing said release communication and opening said supply communication and said inshot communication, said movable abutments thereafter being movable relatively toward each other against resistance of said inshot spring to the opposite limit of such lost-motion connection when brake cylinder pressure exceeds a preselected value to actuate said valve means to a different position for thereby causing closure of said inshot communication while maintaining said supply communication open, said movable abutments being operative when brake cylinder pressure thereafter attains a value substantially proportionate to the differential between chamber pressure and the existing value of brake pipe pressure to move in unison and actuate said valve means to a lap position for causing concurrent closure of all of said communications.

2. A valve device of the type comprising two coaxially arranged movable abutments cooperatively connected so as to constitute a stack subject to pressures of fluid in a brake cylinder and in a brake pipe acting in opposition to pressure of fluid in a chamber normally containing fluid at the normal charge value of brake pipe pressure, and wherein the stack is biased by resilient means to a release position in which a release valve is opened for connecting the brake cylinder to a release communication, and wherein the stack is operable responsively to a reduction in brake pipe pressure below normal charge value to an application position in which the release valve is seated and a supply valve is unseated for supplying fluid to the brake cylinder via a restriction and at a pressure corresponding substantially to the extent of such reduction, characterized by the provision of means providing a lost-motion-type cooperative connection between the movable abutments, a spring biasing one of the movable abutments in one direction relative to the other to one limit of such lost motion for causing the movable abutments to move in unison during the initial phase of a brake pipe pressure reduction, and a normally closed inshot valve operatively opened by the one movable abutment for supplying fluid under pressure to the brake cylinder in by-pass of the restriction upon a reduction in brake pipe pressure and maintained open until brake cylinder pressure exceeds a preselected value and causes the one movable abutment to move in the opposite direction to the other limit of such lost motion against resistance of said spring.

3. In a fluid pressure brake apparatus of the type comprising a normally charged brake pipe, a source of fluid under pressure, and a brake cylinder: a valve device comprising two coaxially arranged movable abutments cooperatively connected via a lost-motion connection so as to be operable as a stack, said stack being subject to pressure of fluid in a chamber normally containing fluid at the normal charge value of brake pipe pressure acting in opposition to brake pipe pressure and brake cylinder pressure, a release valve normally open and interposed in and controlling connection of the brake cylinder with a brake cylinder release communication, a supply valve normally closed and interposed in and controlling a restricted flow communication between the source and brake cylinder, an inshot valve normally closed and interposed in and controlling another flow communication via which fluid pressure may flow from the source to the brake cylinder at a more rapid rate than through said restricted communication, opening and closure of each of said valves being controlled by said stack, and bias means biasing said movable abutments apart to one limit of the lost-motion connection, said movable abutments while biased apart being movable in unison responsively to a reduction in brake pipe pressure below the pressure in said chamber for closing said release valve and opening said supply valve and inshot valve, said movable abutments thereafter being movable relatively toward each other against resistance of said bias means to the opposite limit of such lost-motion connection when brake cylinder pressure exceeds a preselected value for causing closure of said inshot valve while maintaining said supply valve open, said movable abutments being operative when brake cylinder pressure thereafter attains a value substantially proportionate to the differential between chamber pressure and the existing value of brake pipe pressure to move in unison to a lap position for causing all of said valves to be concurrently closed.

4. Apparatus as claimed in claim 3, wherein the source of fluid under pressure is an auxiliary reservoir charged with pressure fluid from the brake pipe and of such volume as to provide a brake cylinder pressure of a desired value when auxiliary reservoir pressure is caused to equalize into the brake cylinder upon a full service reduction in brake pipe pressure, and wherein said chamber is connected to an emergency reservoir charged with pressure fluid from the brake pipe, and including emergency valve means operative only upon an emergency rate of reduction in brake pipe pressure to connect the emergency reservoir and chamber to the brake cylinder so that a higher brake cylinder pressure will be obtained upon an emergency reduction in brake pipe pressure than is obtained during a full service reduction in brake pipe pressure.

5. Apparatus as claimed in claim 3, wherein the source of pressure fluid is a supply reservoir charged with pressure fluid from the brake pipe and of such volume as to provide a brake cylinder pressure of a desired high value when supply reservoir pressure is caused to equalize into the brake cylinder upon venting of the brake pipe during an emergency application of brakes, and wherein the chamber is connected to a control reservoir charged with pressure fluid from the brake pipe and in which pressure fluid remains bottled up at substantially the normal charge value of brake pipe pressure during both service and emergency applications of brakes.

6. A valve device as claimed in claim 3, including a normally closed charging valve controlling a restricted charging comunication via which pressure fluid may flow between the brake pipe to the chamber, said charging valve being operatively opened by movement of one of said movable abutments relative to the other when brake pipe pressure exceeds the pressure of fluid in said chamber.

7. A valve device as claimed in claim 6, including a release spring resiliently biasing the stack to a release position in which the release valve is opened and said supply valve and inshot valve are closed, and means for limiting the extent of expansion of said release spring so that it will be ineffective to operatively cause opening of said charging valve by said one movable abutment.

8. In a fluid pressure brake apparatus of the type comprising a normally charged brake pipe, a source of pressure fluid, and a brake cylinder: a valve device comprising two coaxially arranged movable abutments, one of which is subject opposingly to brake pipe pressure and fluid pressure in a chamber normally containing fluid at the normal charge value of brake pipe pressure and the other of which is subject opposingly to brake cylinder pressure and atmospheric pressure, a pusher stem engageable by said one movable abutment and movable within defined limits relative to and engageable by said other movable abutment, a release valve controlling connection of the brake cylinder with a release communication, a supply valve controlling one communication including a restriction via which pressure fluid may flow from the source to the brake cylinder, an inshot valve for controlling another communication via which pressure fluid may flow from the source to the brake cylinder at a relatively rapid rate in by-pass of the restriction, another pusher stem interposed between and engageable at opposite ends by the supply valve and inshot valve, respectively, for mechanically opening said inshot valve upon at least a certain degree of opening of said supply valve, a release spring biasing said movable abutments to a release position in which the release valve is opened and said supply valve and inshot valve are closed, an inshot spring operatively bearing against said other movable abutment and said pusher stem for biasing said other movable abutment to one limit position relative to said pusher stem, said movable abutments being movable in unison responsively to a reduction in brake pipe pressure below chamber pressure for successively closing said release valve and then operatively opening said supply valve and then operatively through said other stem opening said inshot valve, said other movable abutment thereafter being movable by brake cylinder pressure in excess of a preselected value against resistance of said inshot spring to an opposite limit position relative to said pusher stem in which the degree of opening of said supply valve is so reduced as to permit closure of said inshot valve, said movable abutments being operative when brake cylinder pressure attains a value substantially proportionate to the existing fluid pressure differential across said one movable abutment to move in unison to a position permitting concurrent closure of all of said valves.

9. Apparatus as claimed in claim 8, wherein the source is an auxiliary reservoir of such volume as to provide a brake cylinder pressure of a desired value when auxiliary reservoir pressure is caused to equalize into the brake cylinder upon a full service reduction in brake pipe pressure, and wherein the chamber has substantially unrestricted connection with an emergency reservoir, and including a one-way flow comunication via which pressure fluid may flow only from the brake pipe to the auxiliary reservoir, a normally closed poppet-type charging valve controlling a restricted charging communication leading from the brake pipe to the emergency reservoir, said charging valve being operatively opened by said one movable abutment only when brake pipe pressure equals or exceeds emergency reservoir pressure, means limiting the expansion of said release spring for preventing it from operatively biasing said one movable abutment to a supply-valve-opening position, and emergency valve means operative only upon an emergency rate of reduction in brake pipe pressure to connect the emergency reservoir to the brake cylinder, such that a brake cylinder pressure of a desired higher value corresponding to equalization of both auxiliary reservoir pressure and emergency reservoir pressure into the brake cylinder will be obtained only upon an emergency rate of reduction in brake pipe pressure.

10. Apparatus as claimed in claim 8, wherein the source is a supply reservoir of such volume as to provide a brake cylinder pressure of a desired high value when supply reservoir pressure is caused to equalize into the brake cylinder upon venting of the brake pipe during an emergency application of brakes, and wherein the chamber has substantially unrestricted connection with a control reservoir, and including a one-way flow communication via which pressure fluid may flow only from the brake pipe to the supply reservoir, a normally closed poppet-type charging valve controlling a restricted charging communication leading from the brake pipe to the control reservoir, said charging valve being operatively opened by said one movable abutment when brake pipe pressure equals or exceeds control reservoir pressure, and means limiting the expansion of said release spring for preventing it from operatively biasing said one movable abutment to a supply-valve-opening position.

11. In a fluid pressure brake apparatus of the type comprising a normally charged brake pipe, a source of fluid under pressure, and a brake cylinder: a valve device comprising two movable abutments, means providing a lost-motion cooperative connection between said movable abutments, a release valve connected to one of the movable abutments and controlling connection of the brake cylinder with a brake cylinder release communication, a supply valve biased to a seated position and controlling a restricted flow communication between the source and brake cylinder, an inshot valve biased to a seated position and controlling another flow communication via which pressure fluid may flow from the source at a more rapid rate than through said restricted communication, an inshot spring biasing said one movable abutment in one direction relative to the other and to one limit of the lost-motion connection, said movable abutments being arranged to constitute a fluid pressure motor which is subject to pressure of fluid in a chamber normally containing fluid at the normal charge value of brake pipe pressure acting in opposition to brake pipe pressure and brake cylinder pressure and which controls operation of each of the aforesaid valves, and means biasing said motor to a release position in which with said one movable abutment biased to said one limit said release valve is unseated from the supply valve and the supply valve and inshot valve are seated, said movable abutments being movable in unison responsively to a reduction in brake pipe pressure below the pressure in said chamber to define an inshot position of the motor in which said release valve is seated against and unseats the supply valve and the supply valve acting through a pusher operatively unseats the inshot valve, said one movable abutment thereafter being movable in the opposite direction relative to the other and to the other limit of the lost-motion connection against resistance of said inshot spring when brake cylinder pressure exceeds a preselected value to define an application position of the motor in which the pusher is retracted sufficiently to permit seating of the inshot valve and the supply valve is held unseated by the release valve, said movable abutments being operative when brake cylinder pressure thereafter attains a value substantially proportionate to the differential between chamber pressure and the existing value of brake pipe pressure to move in unison to a position defining a lap position of the motor in which all of the aforesaid valves are concurrently seated.

References Cited in the file of this patent

UNITED STATES PATENTS 2,913,282    Jeffrey  ---------------- Nov. 17, 1959